United States Patent

[11] 3,562,570

[72] Inventor George Frank
 Cupsaw Lake, N.J.
[21] Appl. No. 4,254
[22] Filed Jan. 20, 1970
[45] Patented Feb. 9, 1971
[73] Assignee The Bendix Corporation
 a corporation of Delaware

[54] ARMATURE-COMMUTATOR ASSEMBLY AND METHOD OF ASSEMBLING AN ARMATURE-COMMUTATOR
7 Claims, 8 Drawing Figs.

[52] U.S. Cl. .................................................. 310/234,
 29/596, 310/236, 310/216, 310/42
[51] Int. Cl. ...................................................... H02k
[50] Field of Search .......................................... 310/233, 4,
 5, 6, 216, 42; 29/596, 597, (Inquired)

[56] References Cited
UNITED STATES PATENTS
1,631,186 6/1927 Apple ........................... 310/235X
2,298,862 10/1942 Balz et al. ..................... 310/233X
2,756,354 7/1956 Baron ........................... 310/43
2,861,203 11/1958 Luneau et al. ................ 310/40

Primary Examiner—D. X. Sliney
Attorneys—Herbert L. Davis and Plante, Arens, Hartz, Smith and Thompson ABSTRACT: An armature-commutator assembly and method of assembling an armature-commutator of a type formed of ferromagnetic lamina or sheet metal plates having slots defined by radially extending teeth with a hole extending axially through each tooth of each lamina. The axially extending holes in each tooth of the assembled armature lamina providing a longitudinally extending channel opening in which an insulating tubing may be inserted so as to extend therethrough for receiving therein a shank or stem portion of a commutator bar. In assembling the armature-commutator, the stem portion of each of the commutator bars are initially only partially inserted into the insulating tubing in the channel holes in the commutator teeth so that appropriate connections may be then made between electrical terminal ends of coil windings wound in the slots of the armature defined by the radially extending teeth of the armature. The stem portions of the commutator bars thereafter are fully inserted into the insulating tubing in the channel holes in the armature teeth with projecting head portions of the commutator bars being provided at free end portions of the bars so as to form an effective commutator surface at one end of the armature assembly. The armature-commutator assembly is then potted and machined to meet the requirements of the dynamoelectric machine in which the same is to be utilized.

INVENTOR.
GEORGE FRANK
BY Herbert L. Davis
ATTORNEY

INVENTOR.
GEORGE FRANK
BY Herbert L. Davis
ATTORNEY

PATENTED FEB 9 1971 3,562,570
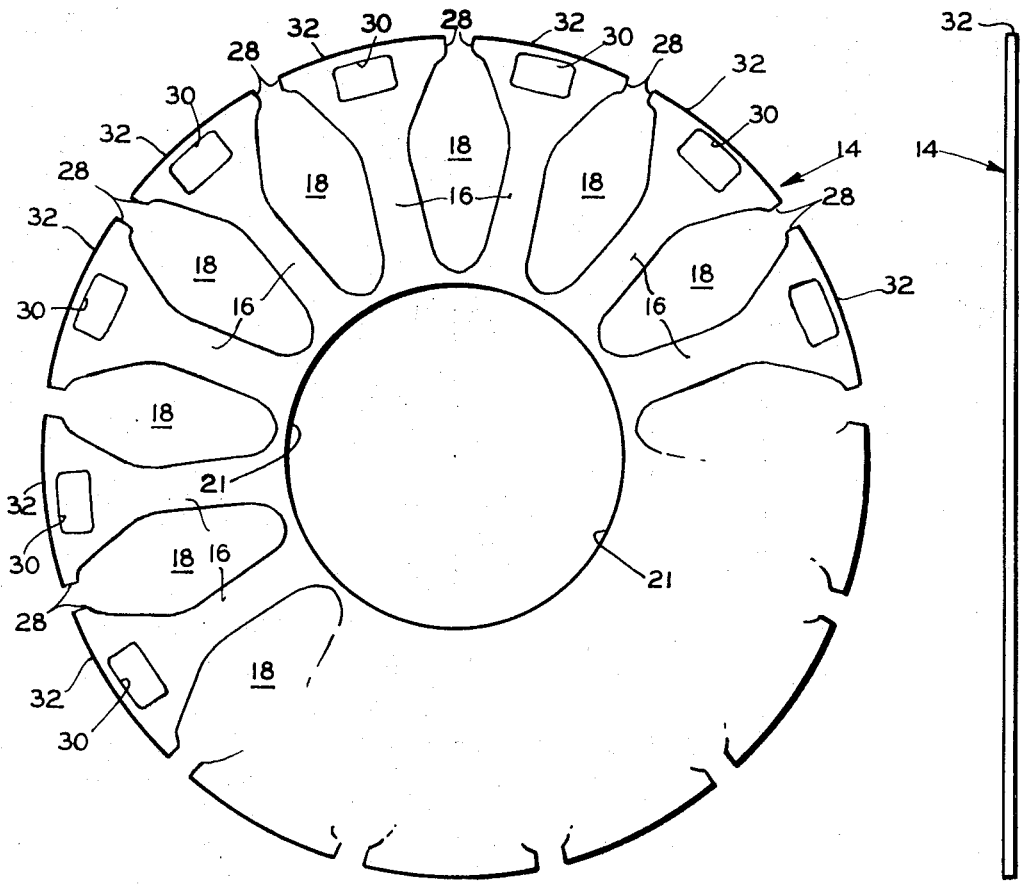
FIG. 5
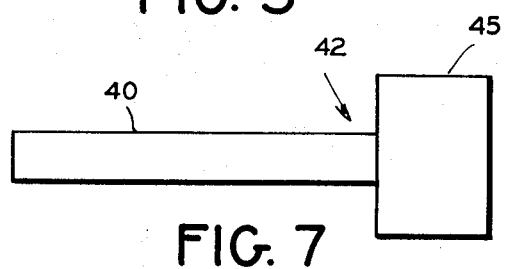
FIG. 7
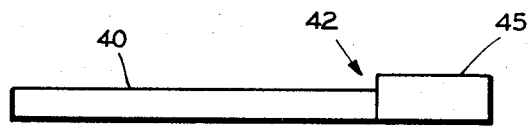
FIG. 8
FIG. 6
INVENTOR.
GEORGE FRANK
BY Herbert L. Harris
ATTORNEY

3,562,570

ARMATURE-COMMUTATOR ASSEMBLY AND METHOD OF ASSEMBLING AN ARMATURE-COMMUTATOR

BACKGROUND OF THE INVENTION

1. Field of the Invention

A compact armature-commutator assembly in which the armature teeth include means for supporting stem portions of commutator bars having projecting head portions which may be machined to form a commutator surface at one end of the armature of a dynamoelectric machine.

2. Description of the Prior Art

The invention relates to improvements in an armature-commutator assembly and to an improved method of assembling an armature-commutator for utilization in a dynamoelectric machine of a type such as disclosed in a U.S. Pat. No. 2,298,862, granted Oct. 13, 1942 to Harry W. Balz and Lawrence F. Hemphill for a "Dynamoelectric Machine Construction" and to improvements in an armature-commutator assembly and method of assembling an armature-commutator structure for utilization in a dynamoelectric machine of a type such as disclosed in a U.S. Pat. No. 2,861,203, granted Nov. 18, 1958 to John R. Luneau and Christian H. H. Unruh for a torquer.

In the structures disclosed by both of these patents there are utilized coil receiving slots defined by the teeth of the armature structure for receiving the stem or shank of commutator bars with the head portions of the bars being so arranged as to form the commutator of the motor structure.

However in the arrangement disclosed by the aforenoted patents while the space in the slots between the armature teeth are utilized to receive the so-called shank of the bars of the commutator, the resultant loss of slot area and concomitant loss of armature copper of the coil windings received therein may inherently effect a severe degrading in the output characteristics of the structure of the dynamoelectric machine disclosed by such patents.

Furthermore, in a U.S. Pat. No. 2,756,354 granted July 24, 1956 to R. M. A. Baron for "Armatures of Electric Motors" there has been disclosed another arrangement in which commutator rods are embedded in an electrical insulating core moulded in a central bore formed in stacked lamina of the armature assembly of the disclosed dynamoelectric machine. Such arrangement, however, is not readily adaptable to an electric motor of the minute size to which the present invention is particularly directed.

Furthermore the provision of a core of an electrically insulated material within an axial bore formed in ferromagnetic stack sheet stampings of an armature assembly, such as disclosed in the Baron U.S. Pat. No. 2,756,354, may also effect a concomitant loss of armature iron to in turn effect a severe degrading of output characteristics of the dynamoelectric machine utilizing such an armature-commutator assembly as well as provide an armature-commutator assembly which is not subject to the ease and expediency of assembly of that of the armature-commutator of the present invention.

The present invention rests in a conception which simplifies the assembly and method of assembly of a dynamoelectric machine of minute size in the stamping of the lamina for forming the armature assembly of the machine with separate openings in the teeth of each lamina so as to provide channel openings in the teeth of an assembled lamina stacked core of the armature assembly for receiving stem portions of commutator bars, while at the same time the assembly and method of assembly of the present invention is such as to raise the percent of durability and certainty of operation of the machine of such minute size so as to effect a condition of greater durability and one which is more sure to produce the desired result in emergency and not only with greater certainty but with less expense.

SUMMARY OF THE INVENTION

As distinguished from the structural arrangement and method of assembly disclosed in the aforenoted patents, the present invention contemplates the provision of separate openings formed in each of the teeth of the armature lamina at the time of the initial stamping of the lamina of a ferromagnetic sheet metal material. Thereafter the stamped sheet metal lamina are assembled in the form of a cylindrical core with the stamped openings in the teeth positioned in a corresponding axially aligned relation so as to provide channel openings extending axially in the cylindrical core of the armature assembly in parallel relation for receiving therein tubular insulating elements in which may be received stem or shank portions of the several commutator bars. Each of the commutator bars having head portions at outer ends of the bars so arranged as to form a commutator assembly at one end of the cylindrical armature core within a predetermined overall axial length, as well as overall diameter of the armature.

The invention contemplates as another object, the provision of a novel armature-commutator assembly for a dynamoelectric machine including a cylindrical core of a ferromagnetic material, the core having an axis of rotation and transverse slots in a cylindrical surface thereof, said slots defined by radially extending teeth, each of the teeth of the armature structure including axially extending openings therein for receiving insulated stem or shank elements of commutator bars, and which stem or shank elements serve as electrical leads from coil windings mounted in the slots defined by the teeth of the armature with coil ends extending beyond the ends of the slots in an arrangement in which commutator head portions of the commutator bars are effectively mounted within the overall axial length of the armature determined by the core and the coil ends extending therefrom as well as within the overall diameter of the armature determined by the radius between said cylindrical surface and the axis of rotation of the core.

Another object of the invention is to provide an improved method of assembling the foregoing armature-commutator structure in which laminations of ferromagnetic sheet metal material may be stamped with a plurality of axially extending teeth defining therebetween slots for receiving armature winding coils of a dynamoelectric machine and in which each of the teeth of the stamped sheet metal lamina having openings stamped therein in close proximity to the circumferential edge surface of each lamina. The sheet metal lamina being thereafter stacked in a core assembly with teeth defining slots and with the openings in the teeth in a corresponding axial alignment so as to provide channel openings extending in parallel longitudinal relation through the core. Armature winding coils may be thereafter received in the slots of the assembled core for electrical connection thereafter at suitable electrical terminals to a stem or shank portion of each of the commutator bars formed of an electrically conductive material. Prior to assembly of the commutator bars in the core, there are inserted into the axially extending channel openings in the teeth of the armature tubular electrical insulating elements. Thereafter a stem or shank portion of a commutator bar is partially inserted in each of the tubular elements so as to be electrically insulated from the armature lamina. Each stem portion is then electrically connected to suitable electrical terminals of the armature winding coils and thereafter the stem portions are fully inserted into the tubular insulating elements in the axially extending channel openings formed in the teeth of the armature core with a head portion of each of the commutator bars being positioned adjacent to and electrically insulated from an end surface of the stacked armature core by a sheet of insulating material and positioned in close proximity to the circumferential surface of the stacked armature lamina core assembly and in close proximity to the axial limit of the length of the armature assembly, as defined by the armature core and ends of the armature winding coils extending from the ends of the slots formed in the core.

These and other objects and features of the invention are pointed out in the following description in terms of the embodiment thereof which are shown in the accompanying drawings. It is to be understood, however, that the drawings are for the purpose of illustration only and are not a definition of the limits of the invention. Reference is to be had to the appended claims for this purpose.

DESCRIPTION OF THE DRAWINGS

In the drawings corresponding numerals indicate corresponding parts in the several views:

FIG. 5 is an end view illustrating the detailed structure of a sheet metal plate of the armature lamina and illustrating the openings formed in the teeth of the lamina in close proximity to the circumferential edge surface thereof.

FIG. 6 is an end view of the armature lamina of FIG. 5.

FIG. 7 is a top plan view of a commutator bar.

FIG. 8 is a side view of the commutator bar shown by FIG. 7.

DESCRIPTION OF THE INVENTION

Figure 1:
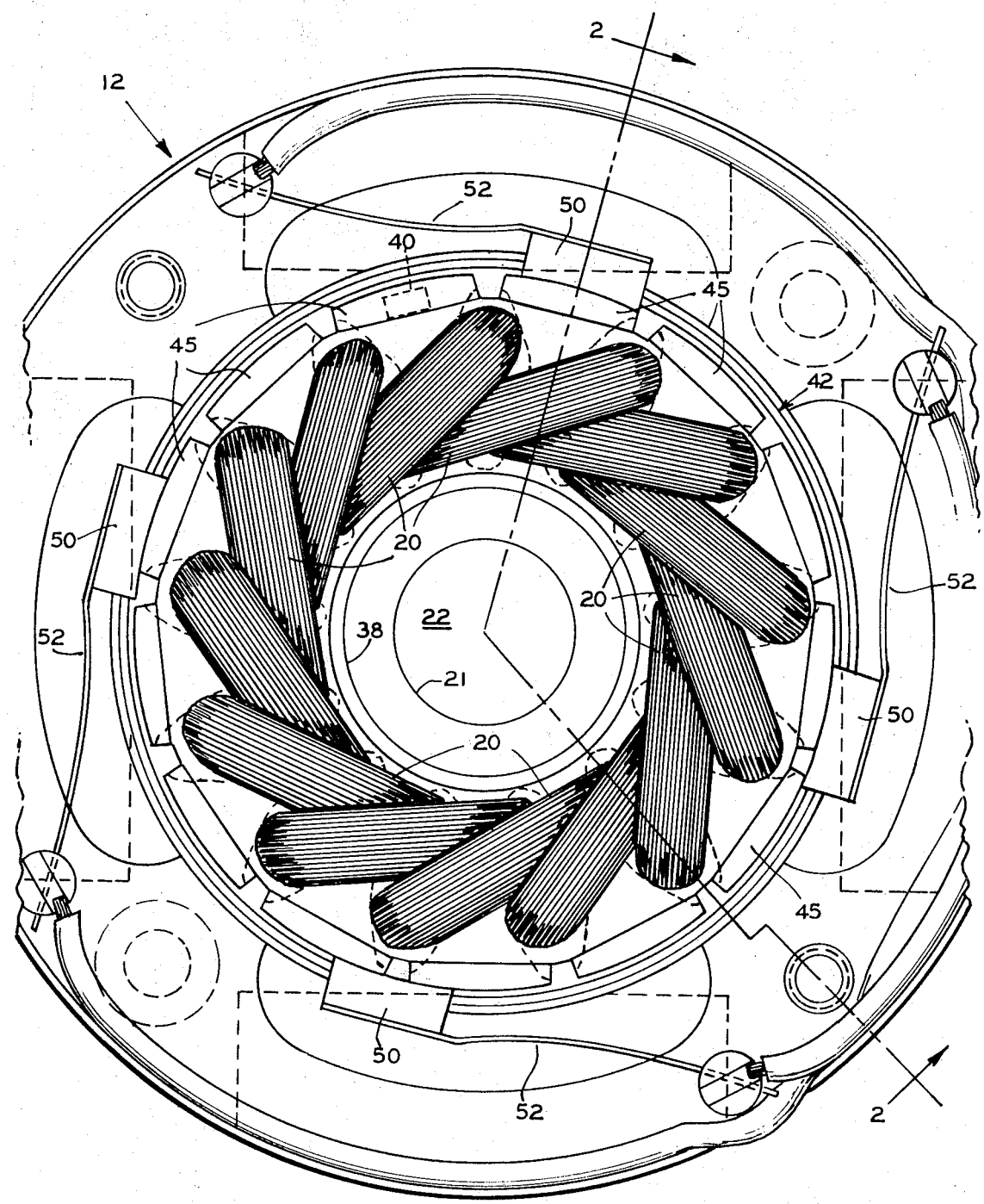
FIG. 1 is an enlarged end view of a dynamoelectric machine embodying the improved armature-commutator assembly of the present invention and showing a typical brush supporting structure in cooperative relation with the commutator.
Figure 2:
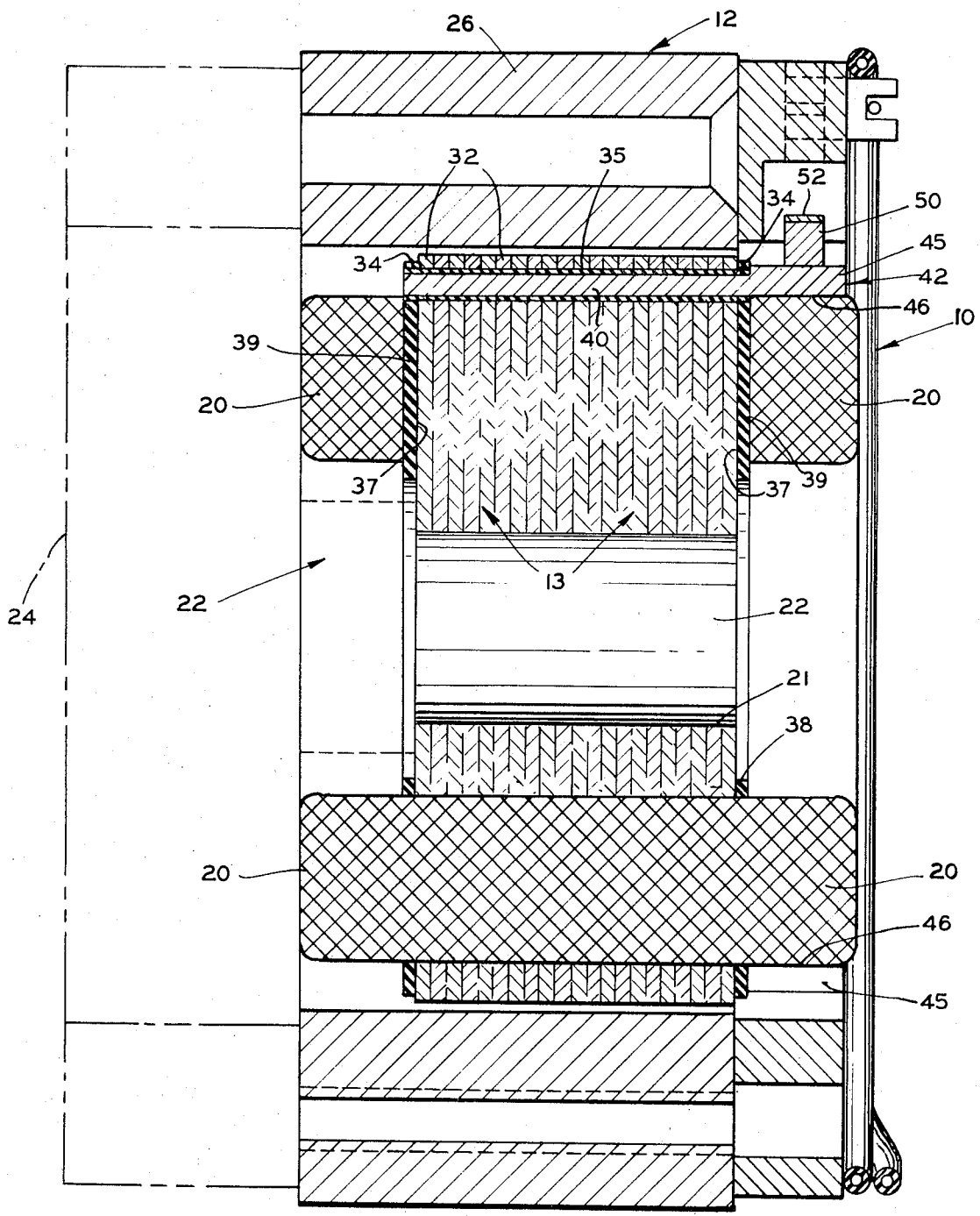
FIG. 2 is a sectional view of FIG. 1 taken along the lines 2—2 and looking in the direction of the arrows.

In the present invention, as shown by FIGS. 1 and 2, the improved armature structure 10 is applied to a dynamoelectric machine indicated generally by the numeral 12. The armature 10 may include a core assembly 13 of a plurality of lamina of sheet metal plates 14 of a ferromagnetic material and one of which is indicated in detail at FIGS. 5 and 6.

The plates 14 include a plurality of radially extending teeth 16 defining therebetween radial slots 18 for receiving therein suitable armature winding coils 20, as shown by FIGS. 1 and 2, formed of electrical conductors arranged in the winding slots 18 of the core assembly 13 of the armature 10. The lamina or sheet metal plates 14 of the armature 10 are formed of a suitable ferromagnetic material having a concentric circular opening 21. The assembled core 13 of the armature 10 may be mounted on a shaft 22 which may project through the circular openings 21 in the assembled parts of the core 13 and be rotatably positioned in a suitable bearing 24. The shaft 22 is arranged in concentric relation to a magnetic ring 26 of the dynamoelectric machine 12.

Each of the adjacent radial teeth 16 of the lamina or sheet metal plates 14, as shown in FIG. 5 include lip portions 28 overhanging and partially closing the radial openings into the slots 18 for retaining the coils 20 in the slots 18.

A feature of each of the lamina or sheet metal plates 14 is an opening 30 which may be stamped in each of the teeth 16 adjacent the overhanging lip portions 28 of the openings 30 and simultaneously with the stamping of the slots 18 and in close proximity to the circumferential edge surface 32 of the lamina or sheet metal plate 14.

In the assembly of the core 13 of the armature 10, a plurality of the lamina sheet metal plates 14 are stacked with the teeth 16, slots 18, concentric openings 21 and openings 30 of the several plates 14 arranged in axial alignment. The stack of lamina or sheet metal plates 14 form the core 13 of the armature 10 and may be then suitably secured in the aligned position.

Figure 3:
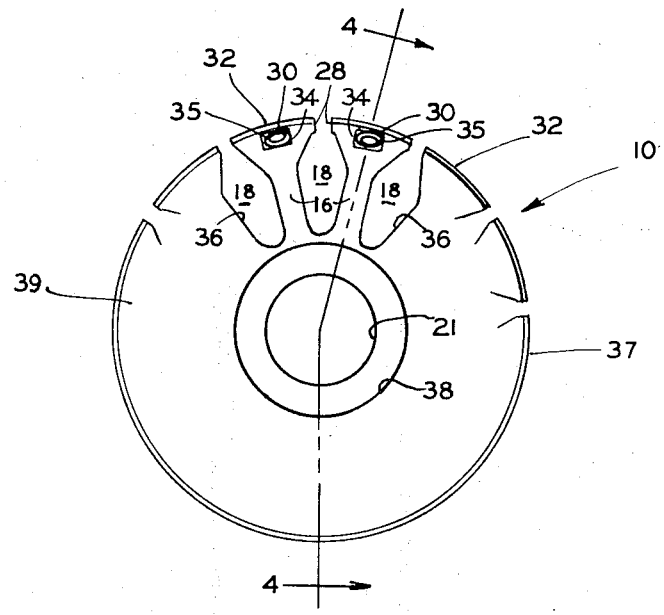
FIG. 3 is an end view of a core of an armature lamina assembly formed of sheet metal plates of a ferromagnetic material with the armature windings removed and illustrating an improved arrangement embodying the present invention in the provision of insulating tubing in channel openings formed in teeth of the lamina for receiving stem portions of the commutator bars shown in the enlarged views of FIGS. 1 and 2.
Figure 4:
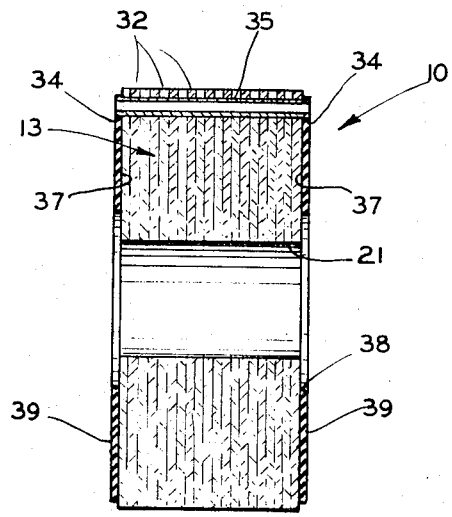
FIG. 4 is a sectional view of FIG. 3 taken along the lines 4—4 and looking in the direction of the arrows so as to show the arrangement of the insulating tubing in a channel opening and discs of electrical insulating material at opposite end surfaces of the armature core.

There is then secured adjacent each outer surface 37 of the end lamina plate 14, as shown in FIGS. 2 and 4, a disc 39 formed of an electrical insulating material and of a shape corresponding to that of the end surface 37 of the lamina 14. Each of the discs 39 are also formed with openings 34, 36 and 38 correspondingly located, respectively, to the slots 18 and openings 30 and 21 in the end lamina 14, as shown in FIG. 3. A tubular element 35 of an electrical insulating material is then inserted in each of the longitudinal channels formed by the aligned openings 30 in the teeth 16 and corresponding openings 34 in the disc 39, as shown by FIGS. 2, 3 and 4. The tubular insulating element 35 is trimmed flush with the outer surface of the discs 39 at opposite ends of the core 13.

Following the assembly of the stacked lamina 14 and insulation discs 39, the coils 20 of the electrical armature windings are received in the slots 18 in a conventional manner and held in place in the slots 18 by the overhanging lip portions 28 of the teeth 16.

The stem portions 40 of the commutator bars 42 are then partially inserted into each of the insulating tubes 35. The stem portion 40 of the commutator bar 42 and the head portion 45 are shown in detail by FIGS. 7 and 8. The commutator bar 42 is formed of a suitable electrical conducting material and has the head portion 45 which projects substantially from the stem portion 40 and beyond the core 13 of the armature 10. The coils 20 of the electrical armature windings are so formed as to provide suitable clearance for the commutator heads 45. Suitable electrical insulating material 46 is provided to electrically insulate the coil windings 20 from the commutator heads 45. Appropriate electrical connections are then made as by soldering suitable electrical terminals of the coils 20 of the armature windings to a part of the stem portions 40 of the commutator bars 42 that is exposed from the tube 35.

After the electrical connections have been made to the commutator bars 42, the stem portions 40 thereof are then fully inserted into the insulated tubings 35 positioned in the longitudinal channels formed by the openings 30 in the lamina 14 of the core assembly 13 with the head portions 45 of the commutator bar 42 in each case being positioned immediately adjacent an outer surface of the electrical insulation lamina or disc 39, as best shown in FIG. 2. The armature-commutator assembly may then be potted with a suitable electrical insulating plastic material and machined to meet operational requirements.

In the assembly of the commutator-armature structure 10 of FIGS. 1 and 2 the commutator bars 42 must be rigidly fixed in place in order to serve as an effective commutator. Accordingly the openings 30, as shown by FIGS. 3 and 5, in the armature teeth 16 of the lamina or sheet metal plates 14 together with the insulating tubing 35 act to hold the stem elements 40 and the head portions 45 in place so as to provide the commutator structure 42, as shown in FIGS. 1 and 2, with suitable brush elements 50 biased under spring tension of a leaf spring 52. In addition a suitable electrical insulating plastic or potting material fills the spacing in the openings 30 so that when cured the potting material completely immobilizes the commutator bars 40.

Furthermore the shape of the openings 30 in the armature teeth 16 and the corresponding shape of the shank or stem elements 40 of the commutator bar 42 may vary with the shape of the armature tooth 16. Thus while a rectangular shape of the opening 30 is shown in the assembly described with reference to FIGS. 1, 2, 3 and 5 it may be readily seen that other shapes as determined by tooth flux density, tooth cross section and other factors may be used as long as rotation of the stem element 40 of the bar is prevented. Some other effective shapes of the opening 30 would be square, triangular and trapezoidal. The shape of the insulation tubing 35 between the stem element 40 of the commutator bar 42 and the armature opening 30 may also vary with any particular design as determined by environmental limits, availability or particular sizes and other factors.

From the foregoing it will be seen that there has been provided an armature-commutator structure with insulated openings in the armature teeth so shaped that properly shaped stem elements 40 of commutator bars 42 inserted therein cannot move, while the whole of the armature commutator assembly when potted or impregnated with a suitable insulating plastic material acts as an armature-commutator assembly as best shown in FIGS. 1 and 2. Moreover in the aforenoted assembly there is provided a method for incorporating a commutator within the overall axial length and overall diameter of the armature structure 10, as best shown in FIGS. 1 and 2.

I claim:

1. An armature for a dynamoelectric machine, the armature being of a type including a cylindrical core of a ferromagnetic material, said core having an axis of rotation and transverse slots in a cylindrical surface thereof, said slots being defined by radially extending teeth of said core, said teeth having portions overhanging and partially closing said slots, the cylindrical core having a radius between said cylindrical surface and the axis of rotation of the core determining an overall diameter of the armature, winding coils in said slots and having coil ends extending beyond said slots, and said coil ends and said core determining an overall axial length of the armature; the improvement comprising each of said radially extending teeth of the core having a channel extending longitudinally through said overhanging portion of the tooth in a parallel relation to said transverse slots and in close proximity to said cylindrical surface of the core, electrically conductive commutator bars, each of said commutator bars including a stem portion and a head portion, the stem portion of each of said commutator bars being positioned in a different one of said longitudinally extending channels and electrically connected to said winding coils, first means positioned in said longitudinally extending channels to electrically insulate the stem portions of said commutator bars from the core, the head portion of each of the commutator bars overlying said coil ends within said overall diameter and within said overall axial length of said armature, the head portions of said commutator bars serving as commutator segments, and second means affixed to an outer end surface of said cylindrical core to electrically insulate the head portions of the commutator bars from the outer end surface of the cylindrical core.

2. The improvement defined by claim 1 in which the first means includes tubular elements of electrical insulating material positioned in each of said longitudinally extending channels to electrically insulate the stem portions of said commutator bars from the core, and in which the second means includes a disc of an electrical insulating material affixed to the outer end surface of the cylindrical core to electrically insulate the head portions of the commutator bars from the outer end surface of the cylindrical core.

3. In assembling an armature-commutator of a type including a cylindrical core of a ferromagnetic material, said core having an axis of rotation and transverse slots in a cylindrical surface thereof, said slots being defined by radially extending teeth of said core; an improved method of assembling the cylindrical core, including the steps of providing a plurality of metal plates, each of said plates being of a ferromagnetic material, forming said metal plates with radially extending teeth defining slots therebetween, forming each of said teeth with an opening therethrough in close proximity to a circumferential edge of the plate, stacking said plates so as to assemble the cylindrical core with the teeth, slots and openings in a corresponding relation so that the corresponding openings form longitudinally extending channel openings through the teeth of the core, the longitudinal channel openings extending in parallel relation to the slots defined by the teeth of the core, winding coils in said slots, partially inserting stem portions of electrically conductive commutator bars into the longitudinally extending channel openings with parts of the stem portions of the commutator bars being exposed from the channel openings, electrically connecting said winding coils to the exposed parts of the stem portions of the electrically conductive commutator bars, and thereafter fully inserting the stem portions of the commutator bars into the channel openings extending longitudinally through the teeth of the core with head portions of the commutator bars projecting from one end surface of the cylindrical core so as to provide an effective commutator surface.

4. The improved method of assembling the cylindrical core defined by claim 3 including the step of inserting into each of the longitudinally extending channel openings an electrical insulating element to insulate the stem portions of the electrically conductive commutator bars from the plates of the assembled core.

5. The improved method of assembling the cylindrical core defined by claim 3 including the step of affixing to an end surface of the assembled core an electrical insulating disc to insulate the head portions of the commutator bars from the end surface of the assembled core.

6. The improved method of assembling the cylindrical core defined by claim 5 including the step of inserting into each of the longitudinally extending channel openings an electrical insulating element to insulate the stem portions of the electrically conductive commutator bars from the plates of the assembled core.

7. The improved method of assembling the cylindrical core defined by claim 3 including the steps of affixing to the one end surface of the assembled core an electrical insulating disc having openings therein corresponding positioned to the openings in the teeth of the assembled core, thereafter inserting through said openings in the insulating disc and into each of the channel openings extending longitudinally through the teeth of the core a tubular electrical insulating element, and then trimming an end of each tubular insulating element flush with an outer surface of the electrical insulating disc preparatory to a later partial insertion of the stem portions of the commutator bars into the tubular electrical insulating elements, the tubular elements thereafter electrically insulating the stem portions of the electrically conductive bars from the plates of the assembled core upon the stem portions being fully inserted into the channel openings while the disc electrically insulates the head portions of the commutator bars from said one end surface of the assembled core.